(12) United States Patent
Nabeiro et al.

(10) Patent No.: US 12,114,804 B2
(45) Date of Patent: Oct. 15, 2024

(54) SYSTEMS AND PROCESSES OF DISTRIBUTION OF EDIBLE PRODUCTS TO A RECIPIENT REGULATED BY SAID RECIPIENT

(71) Applicant: NOVADELTA—COMÉRCIO E INDÚSTRIA DE CAFÉS, LDA, Lisbon (PT)

(72) Inventors: Rui Miguel Nabeiro, Campo Maior (PT); Jesús Medina Mundt, Lisbon (PT); João André De Figueiredo Branco, Moscavide (PT); Marco Filipe Gonçalves Martins, Pedreiras (PT)

(73) Assignee: NOVADELTA—COMÉRCIO E INDÚSTRIA DE CAFÉS, LDA, Lisbon (PT)

(*) Notice: Subject to any disclaimer, the term of this patent is extended or adjusted under 35 U.S.C. 154(b) by 674 days.

(21) Appl. No.: 17/287,615

(22) PCT Filed: Oct. 22, 2019

(86) PCT No.: PCT/PT2019/050036
§ 371 (c)(1),
(2) Date: Apr. 22, 2021

(87) PCT Pub. No.: WO2020/085928
PCT Pub. Date: Apr. 30, 2020

(65) Prior Publication Data
US 2021/0315413 A1 Oct. 14, 2021

(30) Foreign Application Priority Data
Oct. 23, 2018 (PT) .......................................... 115094

(51) Int. Cl.
*A47J 31/52* (2006.01)
*A23F 5/26* (2006.01)
(Continued)

(52) U.S. Cl.
CPC ............... *A47J 31/525* (2018.08); *A23F 5/26* (2013.01); *A47J 31/46* (2013.01); *A47J 31/60* (2013.01);
(Continued)

(58) Field of Classification Search
CPC .......... A47J 31/46; A47J 31/60; A47J 31/525; B67D 1/0894; B67D 2210/00065; A23F 5/26
See application file for complete search history.

(56) References Cited

U.S. PATENT DOCUMENTS

| 11,103,101 B2* | 8/2021 | Nabeiro .................. A47J 31/46 |
| 11,325,820 B2* | 5/2022 | Gonçalves Martins ..................... A47J 31/005 |

(Continued)

FOREIGN PATENT DOCUMENTS

| EP | 1 991 094 B1 | 8/2009 |
| EP | 2 120 652 B1 | 12/2011 |

(Continued)

OTHER PUBLICATIONS

International Search Report for PCT/PT2019/050036 dated May 7, 2020 (PCT/ISA/210).

(Continued)

*Primary Examiner* — Anthony J Weier
(74) *Attorney, Agent, or Firm* — Sughrue Mion, PLLC

(57) ABSTRACT

Systems and processes of distribution of edible products, such as beverages. In particular, a system having a product recipient, a recipient placement disposition operatively associated to an apparatus of distribution of edible products that has a control adapted for control of operation of the distribution of edible products. The apparatus further has an interface operatively associated with the recipient placement disposition and adapted to provide input to the control (Continued)

according to the manipulation of the product recipient, including rotation movement thereof around a reference axis.

20 Claims, 13 Drawing Sheets

(51) Int. Cl.
    *A47J 31/46* (2006.01)
    *A47J 31/60* (2006.01)
    *B67D 1/08* (2006.01)

(52) U.S. Cl.
    CPC .. *B67D 1/0894* (2013.01); *B67D 2210/00065* (2013.01)

(56) References Cited

U.S. PATENT DOCUMENTS

| | | | | |
|---|---|---|---|---|
| 11,524,884 B2* | 12/2022 | Gonçalves Martins | . | B67D 1/06 |
| 11,627,830 B2* | 4/2023 | Nabeiro | ................ | A47J 31/525 |
| | | | | 99/283 |
| 11,767,211 B2* | 9/2023 | Nabeiro | ................. | A47J 31/60 |
| | | | | 141/113 |
| 2008/0223478 A1 | 9/2008 | Hantsoo et al. | | |
| 2010/0043911 A1* | 2/2010 | Russell | .................... | B67D 1/04 |
| | | | | 141/113 |
| 2015/0173561 A1* | 6/2015 | Foster | ................... | A47J 31/401 |
| | | | | 215/11.1 |
| 2015/0320256 A1* | 11/2015 | Kollep | ...................... | A23F 3/18 |
| | | | | 426/433 |
| 2015/0351583 A1* | 12/2015 | Weigelt | ............... | A47J 31/4492 |
| | | | | 426/232 |
| 2020/0114523 A1* | 4/2020 | Knuepfel | ................. | G07F 13/06 |
| 2020/0129003 A1* | 4/2020 | Nabeiro | ................ | A47J 31/468 |
| 2021/0186254 A1* | 6/2021 | Nabeiro | .............. | A47J 31/4403 |
| 2021/0393070 A1* | 12/2021 | Nabeiro | .................. | A47J 31/52 |
| 2022/0125235 A1* | 4/2022 | Nabeiro | .............. | A47J 31/4403 |
| 2023/0270281 A1* | 8/2023 | Nabeiro | ................ | A47J 31/461 |
| | | | | 222/1 |

FOREIGN PATENT DOCUMENTS

| | | |
|---|---|---|
| EP | 2 285 687 B1 | 3/2016 |
| EP | 2 928 347 B1 | 1/2018 |
| WO | 2013/102130 A1 | 7/2013 |
| WO | 2017/200409 A1 | 11/2017 |

OTHER PUBLICATIONS

Written Opinion for PCT/PT2019/050036 dated May 7, 2020 (PCT/ISA/237).

* cited by examiner

SYSTEMS AND PROCESSES OF DISTRIBUTION OF EDIBLE PRODUCTS TO A RECIPIENT REGULATED BY SAID RECIPIENT

CROSS REFERENCE TO RELATED APPLICATIONS

This application is a National Stage of International Application No. PCT/PT2019/050036 filed Oct. 22, 2019, claiming priority based on Portuguese Patent Application No. 115094 filed Oct. 23, 2018.

FIELD OF THE INVENTION

The present invention refers to the field of systems of distribution of edible products, in particular systems for distribution of beverages, presenting discharge means to the interior of a recipient of collection of edible product.

BACKGROUND OF THE INVENTION

There are known systems of distribution of edible products, in particular of beverages, that provide a discharge of edible product along a direction contrary to the gravity force, and through the wall of a recipient of collection of edible product.

In particular in the case of aromatic beverages such as for example espresso type coffee, this beverage discharge is a relevant process with potential impact on the quality in the recipient. Among several aspects, it is important to ensure that the eventual liquid residues from the beverage discharge do not lead to a degradation of the beverage quality. In this particular, the prior art includes solutions relating to drainage of residues and of purge flows of beverage discharge dispositions.

The document EP 1991094 B1 discloses a drinking recipient adapted so that can be filled up from the base and presenting a sealable base wall for such purpose, whereby the beverage is injected under enough pressure to open a valve provided as flow regulation element of beverage discharge.

The document EP 2285687 B1 discloses a system that presents beverage discharge through the base region of a glass. The system discloses discharge means designed for evacuating liquid residues from the beverage discharge means. In particular, the system presents an opening on the placement surface of recipients that is configured in a bowl shape, whereby said opening is adapted so as to discharge eventual rests of beverage that might accumulate on said recipient placement surface.

The document EP 2120652 B1 discloses a system of the type of the present invention, whereby the base region of said drinking recipient can be retained by means of a screw thread on a placement disposition configured as extraction device so that collect a capsule containing an edible substance precursor of beverage, downstream of the fluid discharge and upstream of the base portion of the drinking recipient. Moreover, the base region of said placement disposition presents three transversal projections developing inward that, in correspondence with three transversal projections associated with a fluid discharge disposition and developing outwards, provide the placement and retention of the placement disposition on the fluid discharge disposition by means of rotation of said placement disposition around a respective central axis, thereby providing fluid communication connection of the fluid discharge upstream with the drinking recipient downstream.

The document EP 2928347 B1 discloses a system of the type of the present invention with discharge means designed for evacuating liquid residues from the beverage discharge means. In particular, said discharge means are provided as a junction element that connects an edge portion of a flexible pipe descending from the exit side of an extraction device, and a discharge tube ascending along the vertical, with a discharge tube that develops to an independent exit. The junction element is provided so that can be driven into movement by actuation means, between a non-operative position and an operative position.

GENERAL DESCRIPTION OF THE INVENTION

The objective of the present invention is to provide a system adapted so that provides a simpler and more ergonomic interaction of a user with an apparatus of distribution of edible products, including regulation of the discharge of said edible product into a product recipient by means of manipulation thereof.

This objective is attained according to the present invention by means of a system of preparation of beverages according to claim 1, whereby preferred embodiments are described in the secondary claims.

In particular, the objective above is solved by means of a system whereby the apparatus presents interface means operatively associated with said recipient placement disposition, functionally connected to a control device of the operation of the apparatus, and adapted so that can apprehend at least one of position, state of operative retention and movement of said recipient on said recipient placement disposition, in particular rotation movement around a reference axis, and thereby provide regulation of discharge at least of edible product to said recipient.

The system of distribution of edible products can comprise at least two types of recipient and/or of apparatus for distribution of edible products, such as for example beverages.

The apparatus presents a recipient placement disposition that comprises an upwards-oriented product discharge, a placement surface and, preferentially, retention means adapted for the operative placement of a product recipient, including removable retention thereof, and that provides pressurized injection of discharge flow of edible product, for example a beverage, to the interior of recipient along a direction opposite to the direction of the gravity force, through a base region of the recipient, for example a drinking recipient.

It is preferred when said reference axis corresponds at least approximately to the operative direction of placement of the recipient, to the central axis of the recipient and of the placement disposition, and to the discharge direction of edible product to the recipient.

The recipient and placement disposition can be adapted so that the recipient can only be placed in a single previously defined angular position, or in a plurality thereof, corresponding to a placement position. In particular, the recipient can only be retained in the placement disposition by means of a relative engagement movement including by means of at least one of:

rotation of said recipient around itself, along at least a first rotation direction, preferentially at least along a rotation direction in clockwise direction, vertical translation of the recipient along at least a first direction, preferentially at least along a downwards direction, between said placement position and at least a first retention position, thereby interacting with said selection means.

The system can provide the preparation of at least one type of beverage, for example espresso coffee and similar beverages, the apparatus in this case including a flow pressurization device, for example of the type hydraulic pump, and a product preparation device, for example an extraction device, adapted so that can collect an individual portion of edible substance, for example ground and roast coffee, optionally provided inside of a respective capsule.

The case of systems for preparation of beverages is considered in the forth ensuing description, and therefore, of a drinking recipient, such as for example a glass, cup, or other similar.

Another objective of the present invention is to provide a process of preparation of beverages including the use of a recipient and of a recipient placement disposition, whereby the beverage discharge flows through a base region of said recipient, so that the retention of the recipient is provided in ergonomic manner.

This objective is attained according to the present invention by means of a method of preparation of beverages according to claim 10, whereby preferred embodiments are described in the secondary claims.

DESCRIPTION OF THE FIGURES

The invention shall hereinafter be explained in greater detail based upon preferred embodiments and on the attached Figures.

The Figures show, in simplified schematic representations.

DETAILED DESCRIPTION OF PREFERRED EMBODIMENTS OF THE INVENTION

Figure 1:
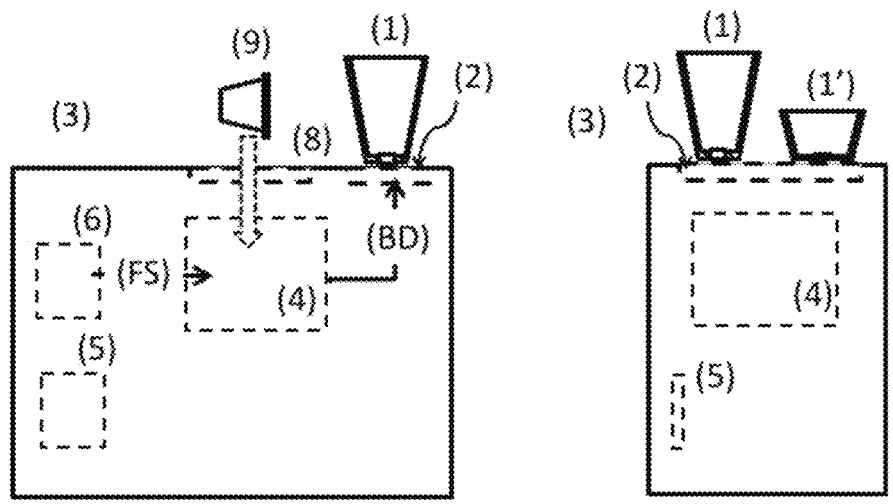
FIG. 1: Side view, on the left side, and front view, on the right side, of main components of system of distribution of edible products of the type of the present invention and according to prior art.
Figure 2:
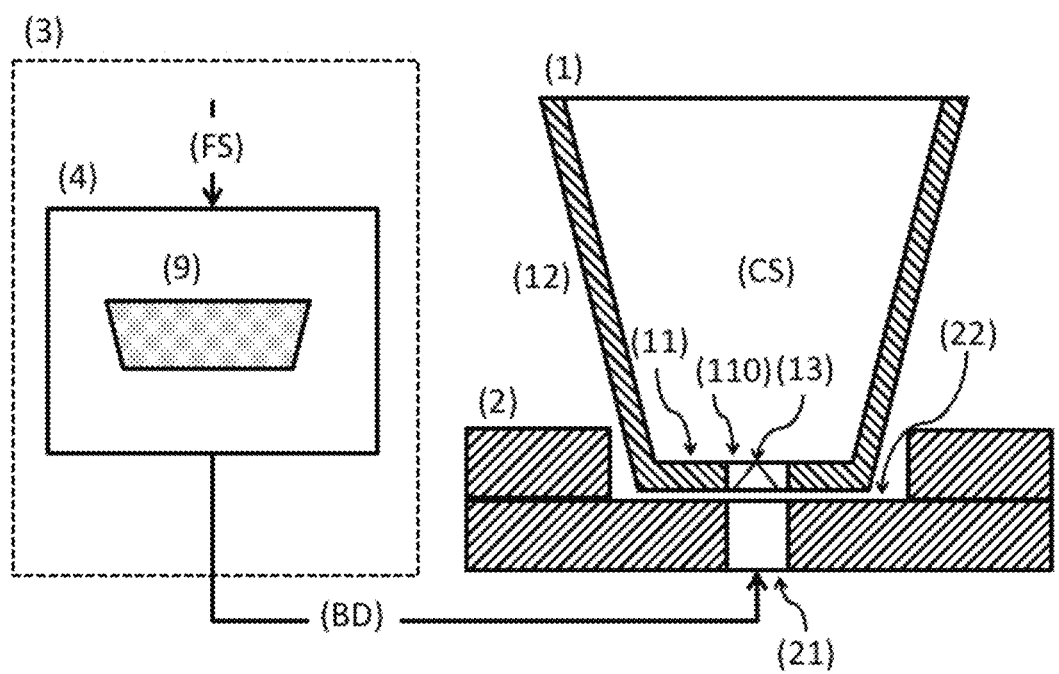
FIG. 2: diagram of a drinking recipient (1) operatively placed on a placement disposition (2) in fluid connection to an apparatus (3), of a system of the type of the present invention and according to prior art.

FIG. 1 represents side view, on the left-hand side, and front view, on the right-hand side, and FIG. 2 represents a functional diagram of a system for distribution of edible products of the type of the present invention, in this case a system of preparation of beverages based upon individual portions (9) of an edible substance.

Said system comprises at least one type of drinking recipient (1, 1'), such as for example a cup or a glass, that presents a base wall (11) comprising a passageway opening (110), a sidewall (12) configuring a drinking opening, whereby said drinking recipient (1) is adapted so that can be operatively retained on a placement disposition (2), that is, in stable and safe manner relative to the force exerted thereupon by the injection of pressurized flow of beverage discharge (BD) through the base region of the drinking recipient (1).

The drinking recipients (1, 1') can present engagement elements in the region of the base wall (11), whereby it is preferred when these engagement elements do not project outwards so that they do not result visible or perceptible on the sidewall (12).

The drinking recipients (1, 1') can present a flow regulation disposition (13), for example of the type single-way valve (symbolically represented by a triangle), retained on a passageway opening (110) of the base wall (11) and adapted so that only provides passageway to a pressurized flow of beverage discharge (BD), downstream, to said collection space (CS), along a direction opposite to the gravity force, if impinged with a flow pressure bigger than a previously defined flow pressure.

In the represented case, said system further comprises a beverage preparation apparatus (3), for example in the form of machine of preparation of espresso coffee and similar aromatic beverages, that presents at least one product preparation device (4), that in the represented case is a coffee extraction device, that can be provided as interior or exterior part of the casing of said apparatus (3) and that can be actuated between open and closed positions, and vice-versa, so that can collect an edible substance that is precursor of the beverage. The edible substance, for example roasted ground coffee beans, can be provided inside of an individual portion (9), for example in the form of a pod, a capsule, or other type of confinement thereof, adapted so that can be collected inside of the product preparation device (4).

Moreover, it is preferred when the beverage apparatus (3) de includes a fluid reservoir (not represented), as well as a flow pressurization device (6) and a fluid heating device (not represented), so that can supply a flow (FS) at a temperature comprised between 60 and 100° C. and at a pressure comprised between 1 and 20 bar, preferentially more than 10 bar, so as to interact with said edible substance.

Said pressurized flow of beverage discharge (BD) is then conducted to an exit of said product preparation device (4) to a placement disposition (2) disposed downstream thereof. Said recipient placement disposition (2) includes at least one product discharge (21) and a recipient placement surface (22) associated with means adapted so that can retain a drinking recipient (1, 1'), preferentially by means of mechanical engagement with the base region (11) thereof, preferentially by means of engagement retention elements that develop inwards and in transversal manner with relation to the prevailing direction of beverage discharge.

The system can include a plurality of types of drinking recipients (1, 1') presenting different dimensions, in particular different dimensions of the respective base walls (11) and/or sidewalls (12), for example diameter, but adapted so as to engage in a same type of placement disposition (2), whereby at least one of said types of drinking recipients (1, 1') is not a disposable recipient.

Said apparatus (3) further comprises control means (5) adapted so that control the operation of the apparatus (3), in particular the start and end of the process of preparation and discharge of beverage to a drinking recipient (1), in case of being apprehended in a correct placement thereof on the placement disposition (2), as well as several other operation parameters of each beverage preparation cycle.

Figure 3:
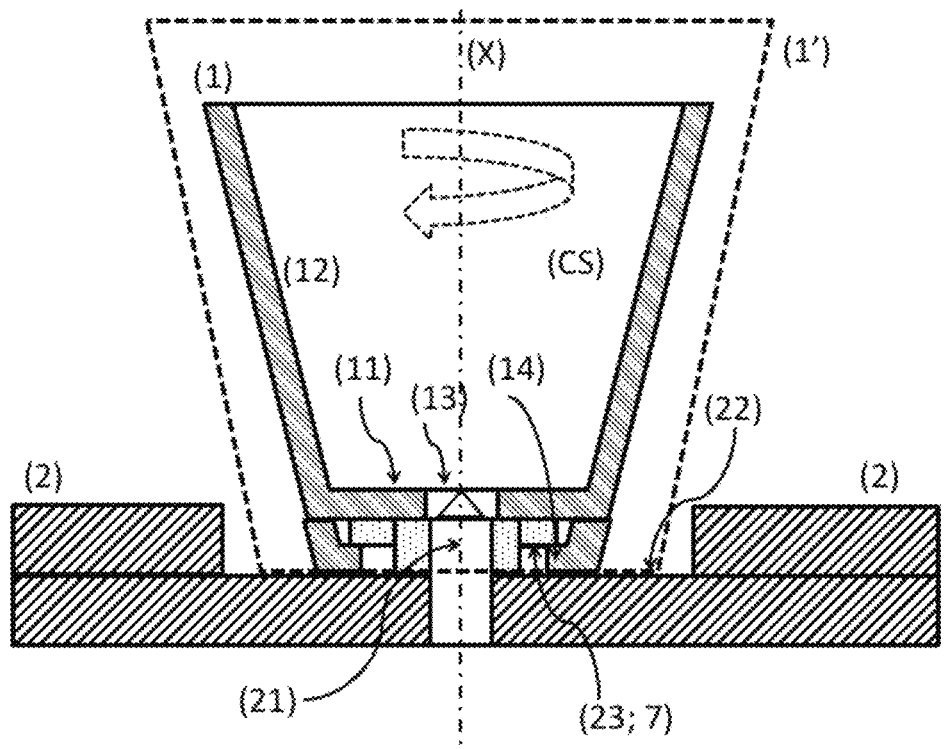
FIG. 3: side cut of a first embodiment of a drinking recipient (1) operatively placed on a placement disposition (2) in a system according to the present invention.

FIG. 3 represents a first embodiment of a system according to the present invention, in particular of a drinking recipient (1) operatively placed on a placement disposition (2) associated with a beverage preparation apparatus (3).

The drinking recipients (1, 1') present a base region configured so that can be placed upon a placement support (22), and further present engagement means (14) on the base region adapted so that can engage with retention means (23) associated with said placement disposition (2), thereby providing placement and operative placement thereon. It is herewith provided a simpler and more reliable retention of the recipient relative to the pressurized fluid discharge along the direction opposite the gravity, through the discharge element (21).

Moreover, according to an inventive aspect, said apparatus (3) further comprises interface means (7) associated with the placement disposition (2) and functionally connected to control means (5) of said apparatus (3), whereby said interface means (7) are adapted so that can apprehend at least one, preferentially several aspects at least of a rotation movement of the drinking recipient (1, 1') around itself, around a reference central axis (X) thereof and operatively placed on said placement disposition (2).

In particular, in the case of the represented embodiment, said interface means (7) are provided associated with said retention means (23), and adapted so that can apprehend the direction of rotation and the angular extension of the rotation movement from a reference position of said drinking recipient (1, 1'), for example an initial correct placement position (A) on the placement disposition (2).

Figure 4:
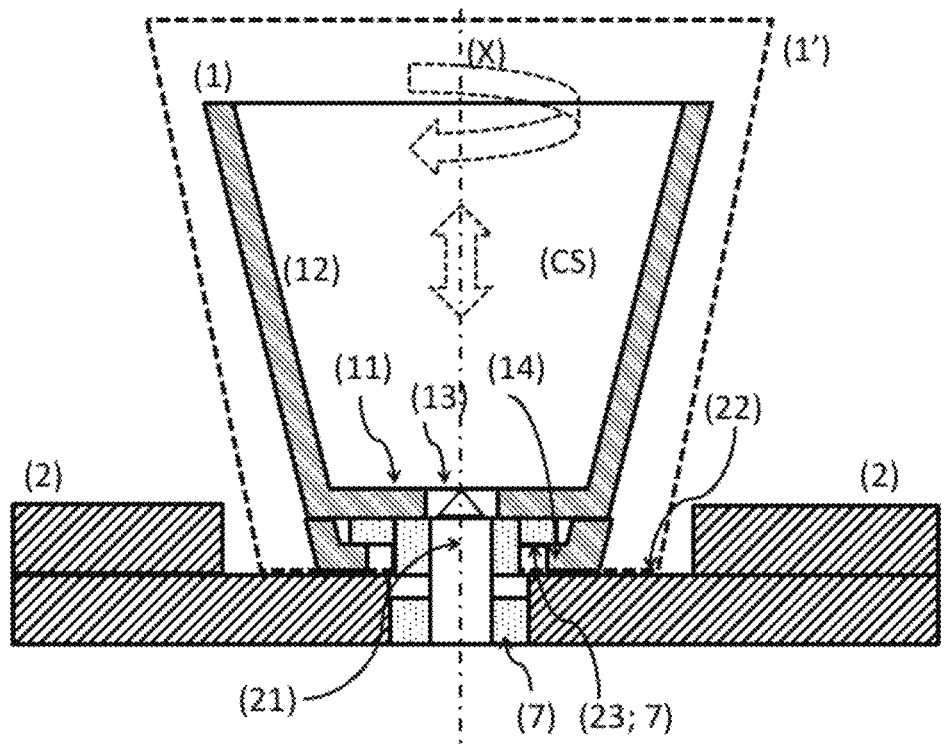
FIG. 4: side cut of a second embodiment of a drinking recipient (1) operatively placed on a placement disposition (2) in a system according to the present invention.

In the case of the embodiment represented in FIG. 4, besides of said interface means (7) adapted so that can apprehend a rotation movement, there are further provided second interface means (7) associated with the product discharge (21) and adapted so that, besides of the aspects of a rotation movement of the drinking recipient (1, 1') around itself, they can also apprehend a touch or pressure exerted thereupon as a result of a vertical movement of the drinking recipient (1, 1') downwards, along the direction of the reference central axis (X).

Figure 5:
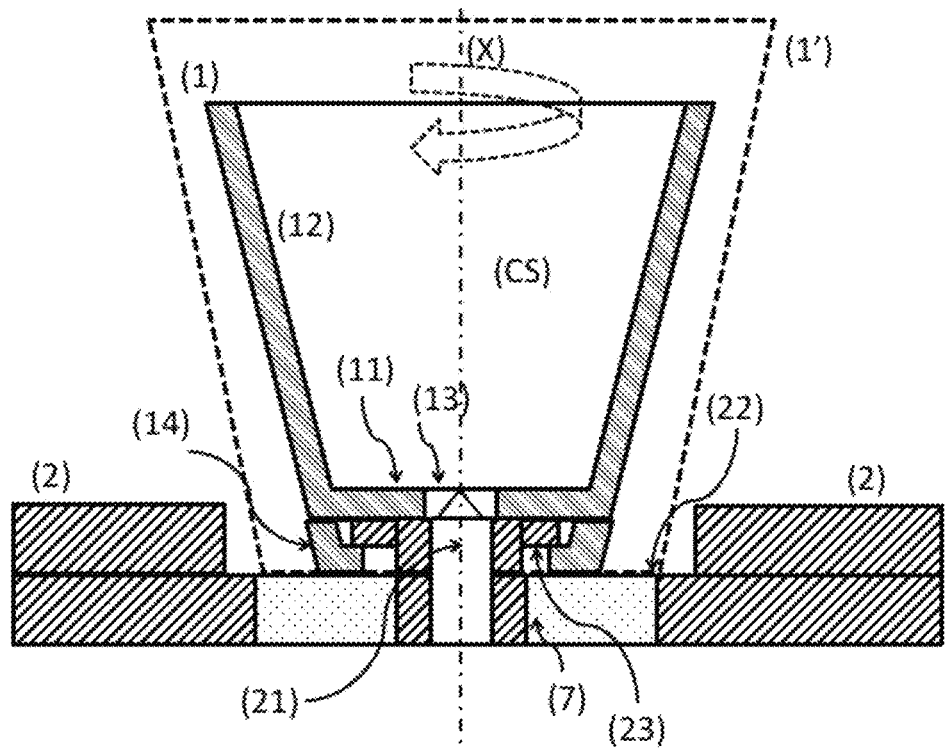
FIG. 5: side cut of a third embodiment of a drinking recipient (1) operatively placed on a placement disposition (2) in a system according to the present invention.

FIG. 5 represents a third embodiment whereby said interface means (7) are associated with said placement surface (22) and adapted so that can be dragged by means of material engagement by the drinking recipient (1) in case the latter is operatively placed on said placement surface (22), along at least one rotation direction thereof, thereby providing an input to the control means (5) of said apparatus (3).

Figure 6:
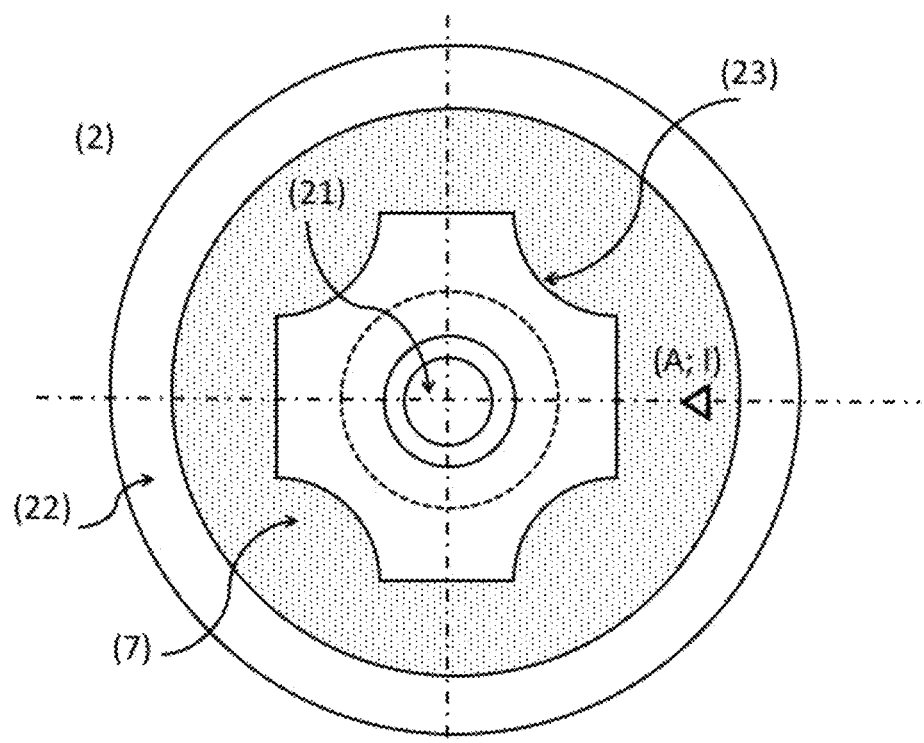
FIG. 6: top view of the placement disposition (2) according to the embodiment of FIG. 5, in a first interaction position of interface means (7) according to the present invention.
Figure 7:
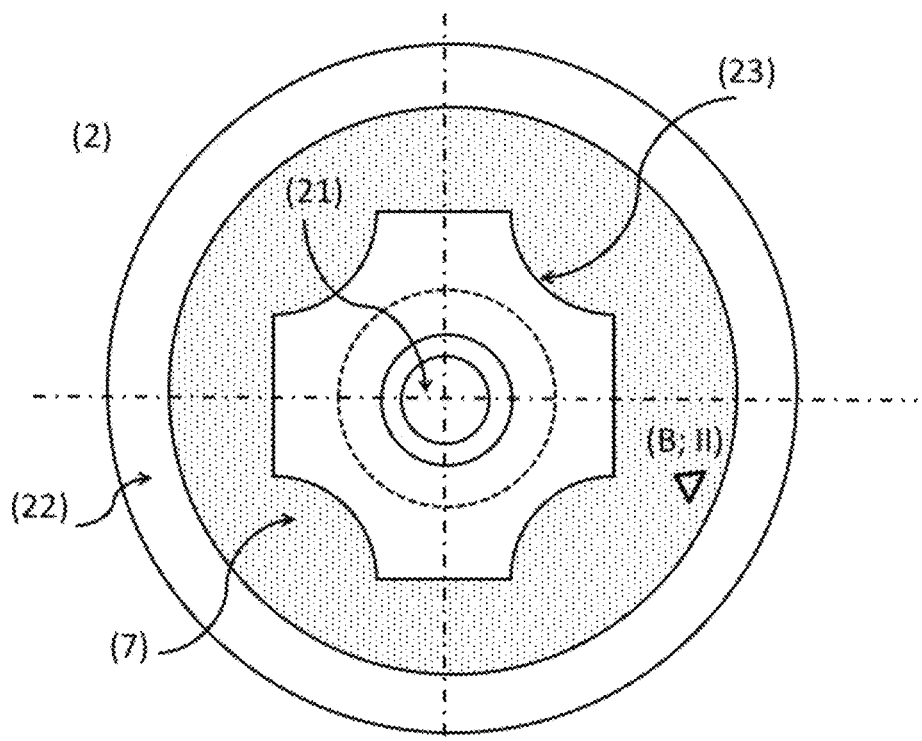
FIG. 7: top view of the placement disposition (2) according to the embodiment of FIG. 5, in a second interaction position of interface means (7) according to the present invention.
Figure 8:
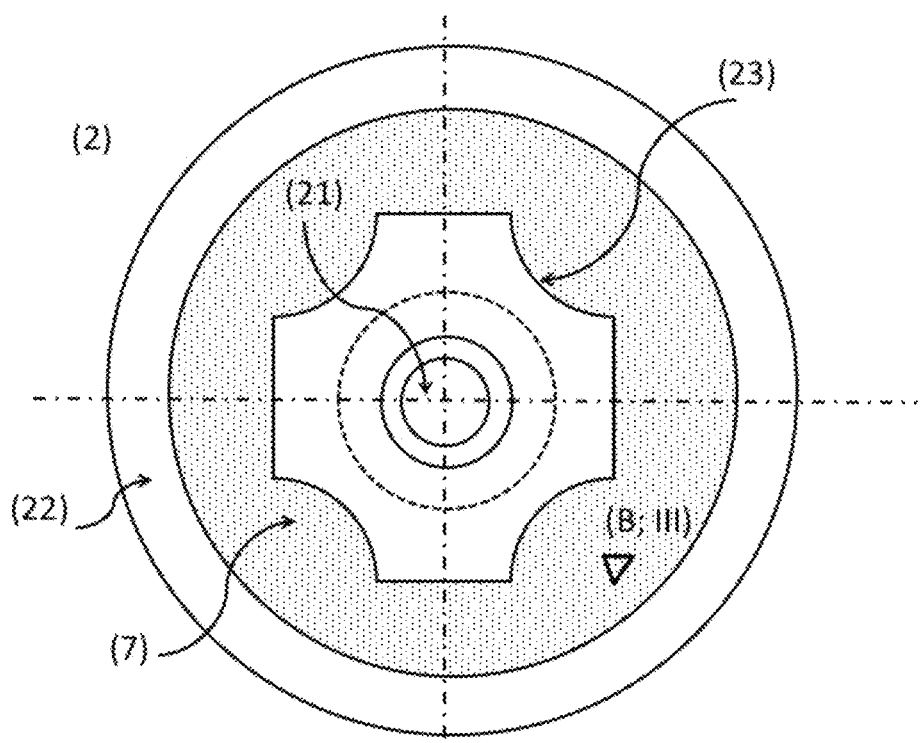
FIG. 8: top view of the placement disposition (2) according to the embodiment of FIG. 5, in a third interaction position of interface means (7) according to the present invention.

As represented on FIGS. 6 to 8, said interface means (7) can be actuated by the rotation movement of the drinking recipient (1) operatively placed on said placement disposition (2) between a first reference angular position (I), corresponding for example to a position of correct placement (A), and at least a second (II), preferentially further at least a third reference angular position (III), corresponding to several retention positions (B) provided along an alignment of manipulation on the placement disposition (2).

In particular, the engagement means (14) and retention means (23) are adapted so that the drinking recipient (1, 1') can be operatively placed on the placement disposition (2) in only up to four previously defined angular positions corresponding to a correct placement position (A; I), whereby said interface means (7) can be rotated by means of dragging thereof by said recipient (1, 1') into at least one retention position (B; II), preferentially further to another position (B; III).

It is preferred when said interface means (7) are adapted so that can apprehend in continuous manner the extension of a rotation movement of up to 90 degrees, preferentially up to 45°, and can provide an input that corresponds to the effective extension of rotation realized by the drinking recipient (1, 1') corresponding to the selection of a given quantity of edible product to be discharged into it.

Alternatively, said interface means (7) can be adapted so that apprehend at least one previously defined angular position of said drinking recipient (1, 1'), and previously associated with a given discharge parameter, or value of discharge parameter of edible product to the drinking recipient (1, 1').

Figure 9:
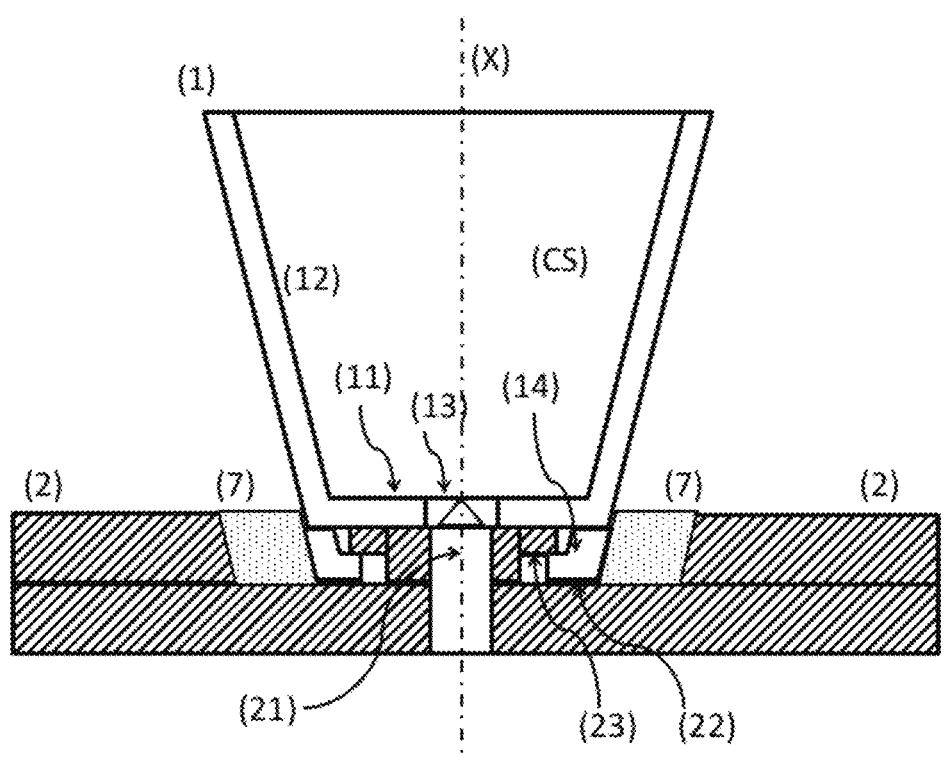
FIG. 9: side cut of a fourth embodiment of a drinking recipient (1) operatively placed on a placement disposition (2) in a system according to the present invention.

FIG. 9 represents a fourth embodiment whereby said interface means (7) are associated with a sidewall that confines said placement surface (22) and adapted so that can be pulled by material engagement by the drinking recipient (1) in case the latter is operatively placed on said placement surface (22), along at least one rotation direction thereof, thereby providing an input to the control means (5) of said apparatus (3).

Figure 10:
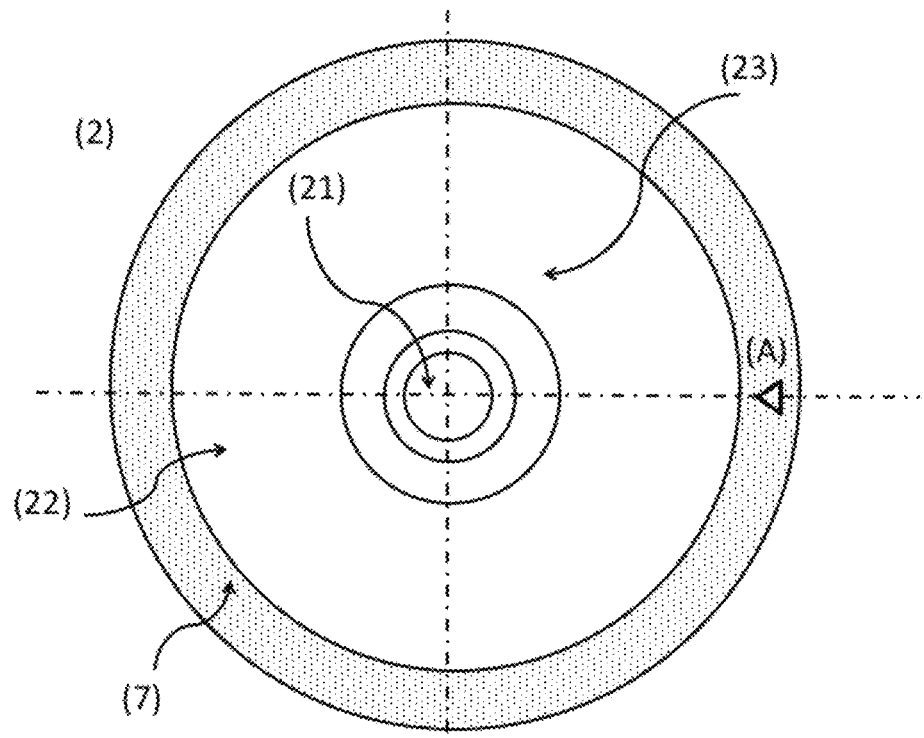
FIG. 10: top view of the placement disposition (2) according to the embodiment of FIG. 9, in a first interaction position of interface means (7) according to the present invention.
Figure 11:
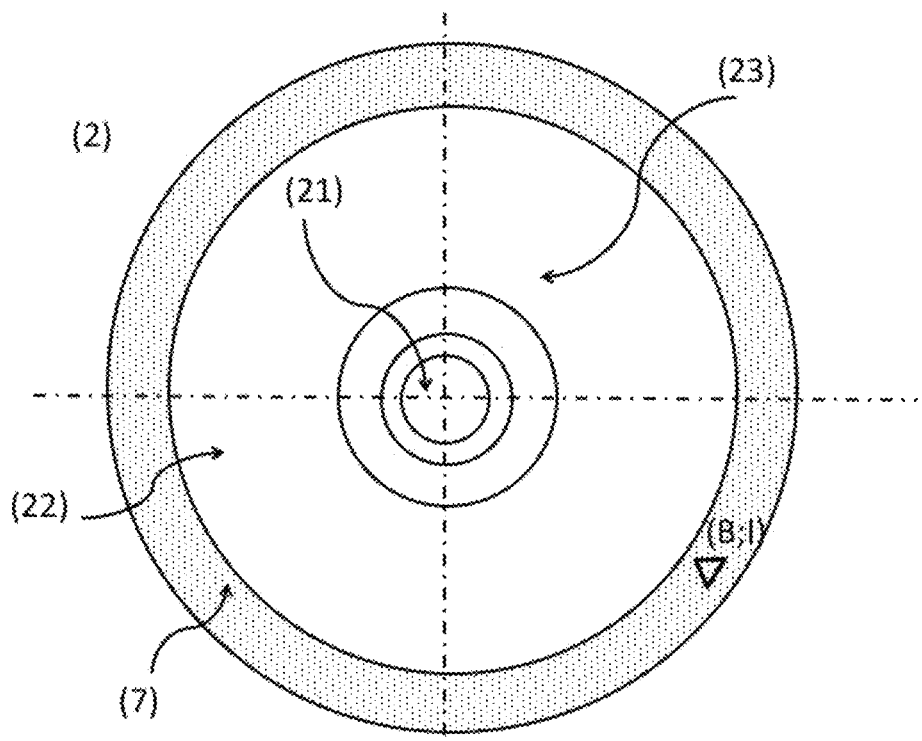
FIG. 11: top view of the placement disposition (2) according to the embodiment of FIG. 9, in a second interaction position of interface means (7) according to the present invention.
Figure 12:
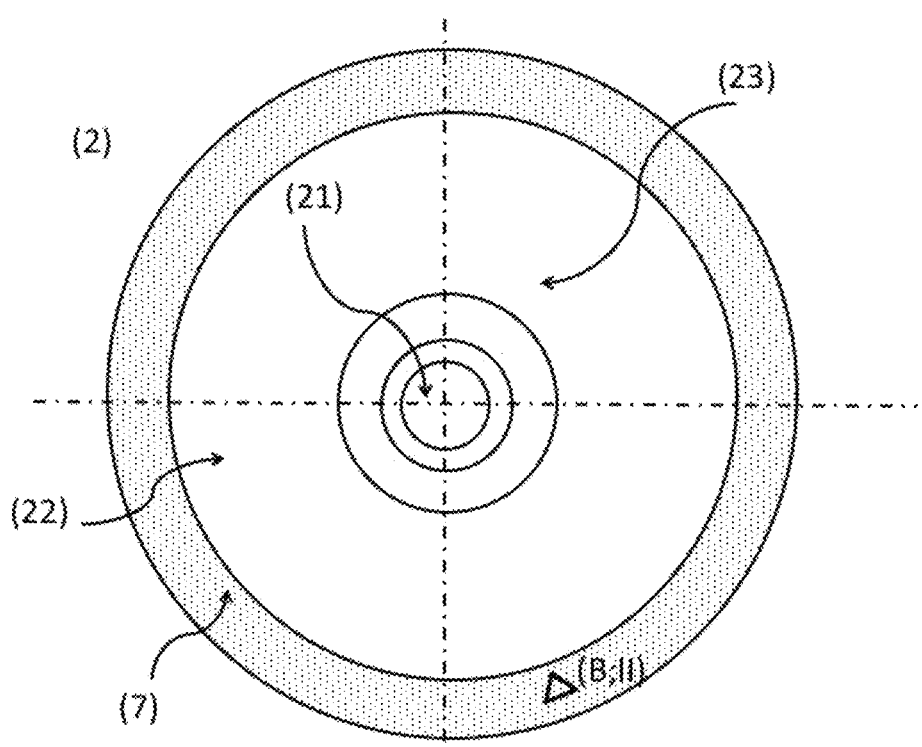
FIG. 12: top view of the placement disposition (2) according to the embodiment of FIG. 9, in a third interaction position of interface means (7) according to the present invention.

In the case of preferred embodiment, represented on FIGS. 10 to 12, the edible product is discharged by the apparatus (3) through the injection device (21) from the moment when the drinking recipient (1, 1') is rotated beyond a second reference position (II), and as long as remains thereon or beyond thereof. The discharge of edible product is interrupted when the drinking recipient (1, 1') is rotated back, beyond said second reference position (II) in the direction of the first reference position (I).

In the case of another preferred embodiment, the temperature of the edible product can be regulated, within an interval of previously defined temperature values, in proportional manner to the extension of rotation of the drinking recipient (1, 1') beyond said second reference position (II) that, corresponds for example to 88 degrees centigrade, and up to said third reference position (III) that corresponds, for example, to 94 degrees centigrade.

Figure 13:
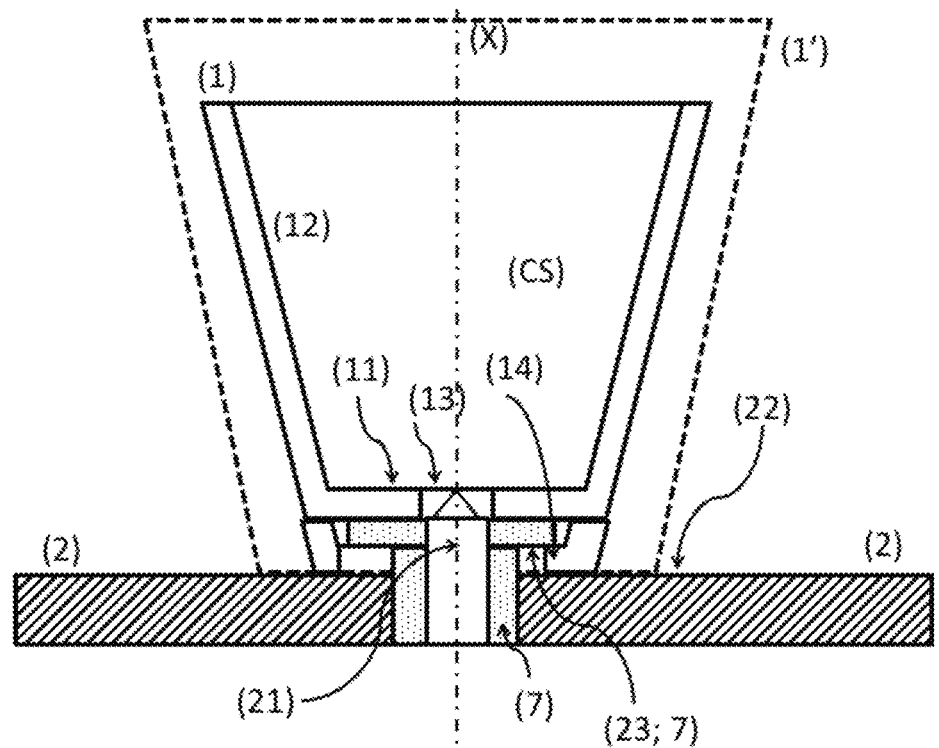
FIG. 13: side cut of a fifth embodiment of a drinking recipient (1) operatively placed on a placement disposition (2) in a system according to the present invention.

FIG. 13 represents a fifth embodiment whereby said interface means (7) are associated with said retention means (23) and adapted so that can be actuated by means of mechanical engagement with the engagement means (14) of said drinking recipient (1) in case the latter is operatively placed on said placement surface (22), along at least one direction rotation thereof, thereby providing an input to the control means (5) of said apparatus (3).

Figure 14:
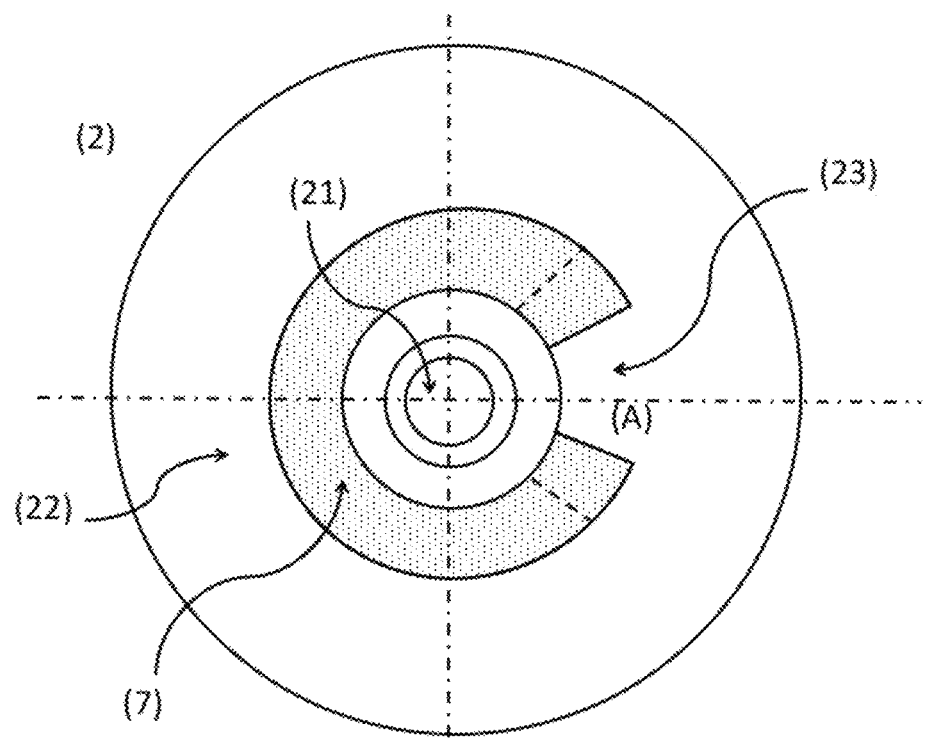
FIG. 14: top view of the placement disposition (2) according to the embodiment of FIG. 13, in a first interaction position of interface means (7) according to the present invention.
Figure 15:
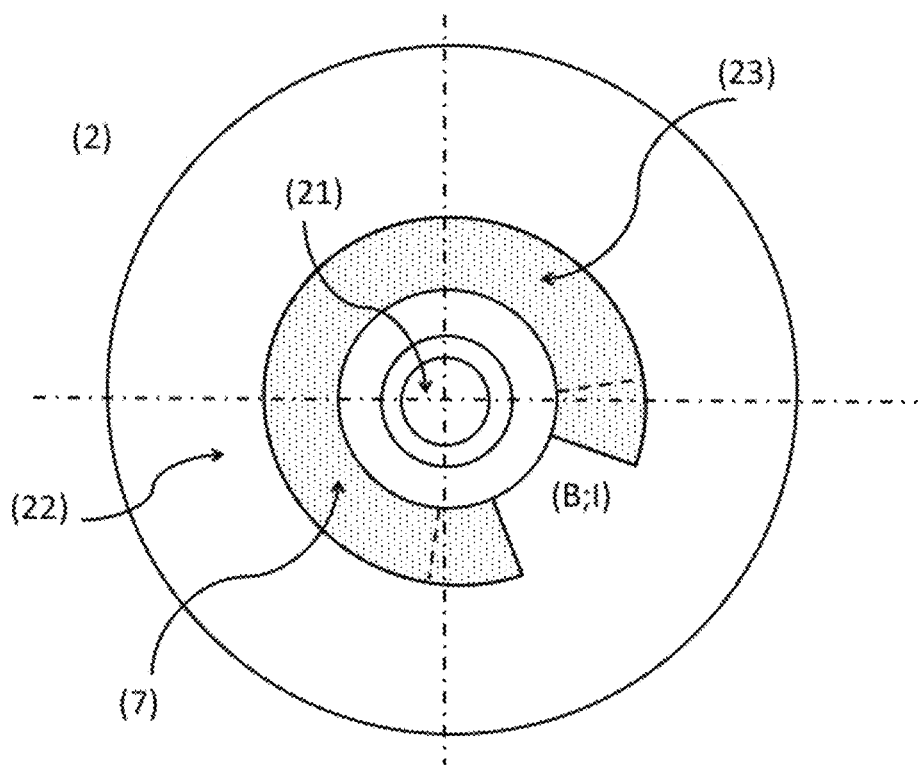
FIG. 15: top view of the placement disposition (2) according to the embodiment of FIG. 13, in a second interaction position of interface means (7) according to the present invention.
Figure 16:
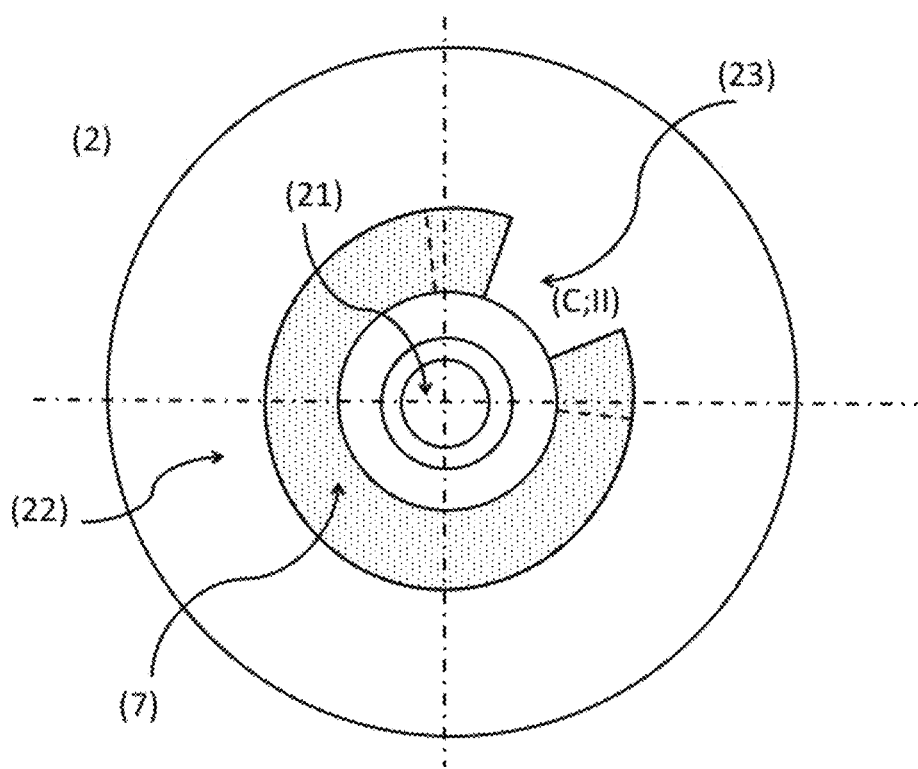
FIG. 16: top view of the placement disposition (2) according to the embodiment of FIG. 13, in a third interaction position of interface means (7) according to the present invention.

As represented on FIGS. 14 to 16, the rotation movement can be realized in the clockwise direction—corresponding for example to the regulation of discharge of edible product, such as espresso coffee—and in the opposite direction, in this case for example corresponding to the regulation of discharge of a flow, for example of water, for cleaning of the recipient placement disposition (2), or for pre-heating of the drinking recipient (1, 1').

Figure 17:
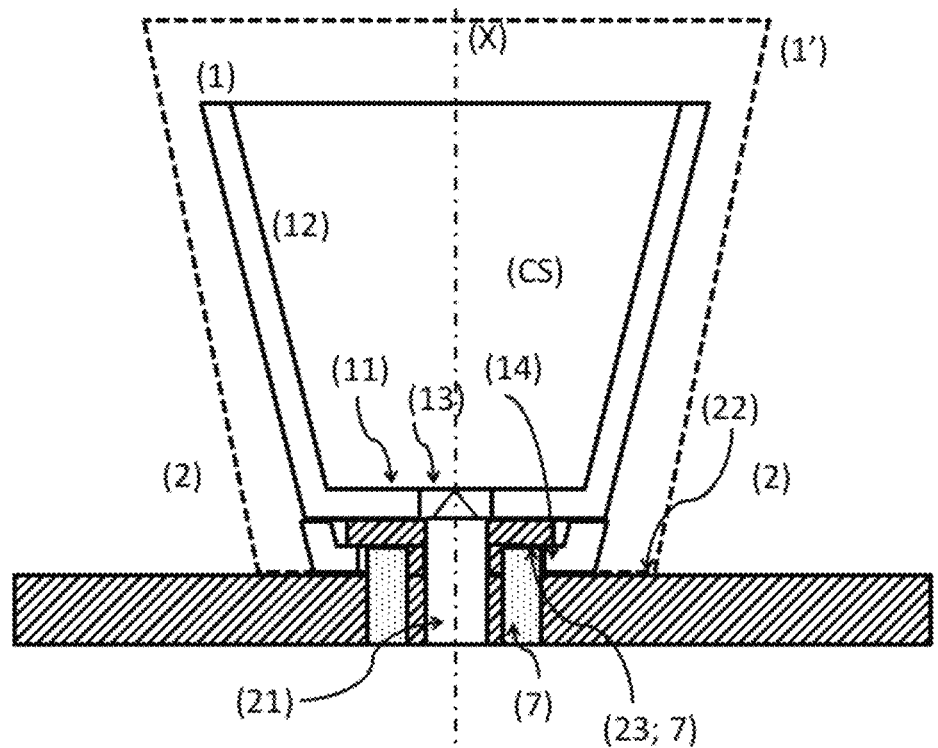
FIG. 17: side cut of a sixth embodiment of a drinking recipient (1) operatively placed on a placement disposition (2) in a system according to the present invention.
Figure 18:
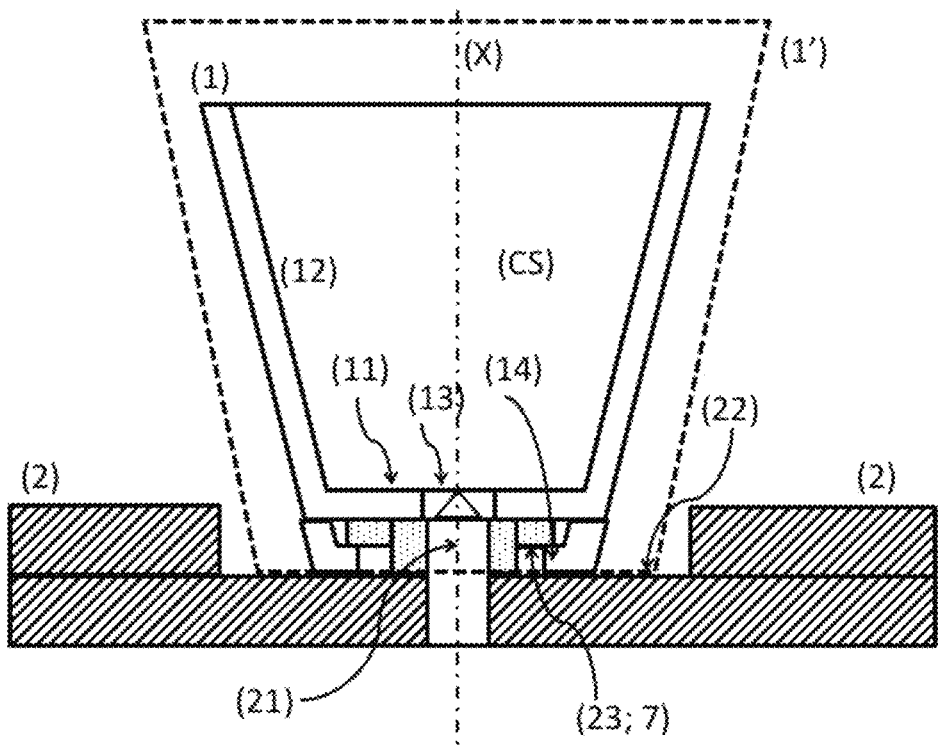
FIG. 18: side cut of a seventh embodiment of a drinking recipient (1) operatively placed on a placement disposition (2) in a system according to the present invention.
Figure 19:
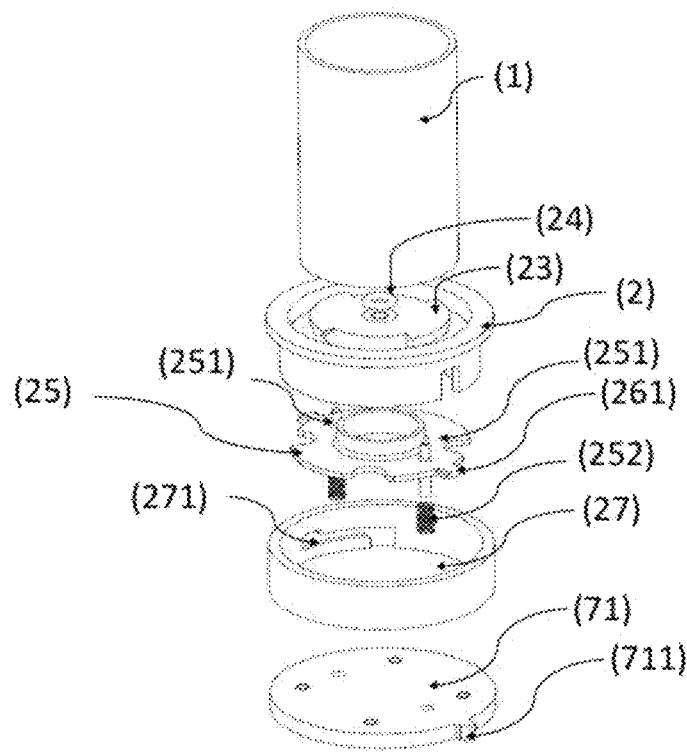
FIG. 19: Exploded view of a detailed embodiment of a drinking recipient (1) and a placement disposition (2) in a system according to the invention.

FIGS. 17 and 18 represent embodiments whereby said interface means (7) can also apprehend at least one of presence of the drinking recipient (1, 1'), for example by direct contact or by electromagnetic interaction, a pressuring action, a translation movement along a vertical direction between an initial position and at least a second position.

The placement disposition (2) can present a mechanic device (not represented), for example of mechanical switch type or mechanical key in operational data connection with other components, and adapted so that only provides retention or possibility of rotation, when the drinking recipient (1, 1') is correctly placed on said placement disposition (2).

The apprehension by the interface means (7) of at least one of the aforementioned aspects, can be used as input for regulation of the actuation of motorized devices of the apparatus (3), such as for example actuation of opening and closing of at least one of: the introduction passageway (8) of portion of edible substance, at least one of two parts of extraction device (4), or other elements.

FIGS. 19 to 22 show a detailed embodiment of the present invention.

A drinking recipient (1) can be placed on a given angular position on the placement disposition (2) so that the base region thereof engages with retention means (23) and seats on a rotation support (26). In this position, the drinking recipient (1) compresses a sealing element (24) of o-ring type, provided in the discharge region of beverage discharge. Still in this position, the drinking recipient (1) actuated an access element (25) that in this case is provided as an actionable pin (251) and elastic springs (252) that is displaced downward when actuated by the drinking recipient (1). Said access element (25) is adapted so that only provides rotation of said rotation support (26) in case of actuation thereof, that is, in case of a correct placement thereof on said placement disposition (2).

Said rotation support (26) is disposed underneath said retention means (23) so that can be rotated around a central axis (X) thereof, actuated by means of being contact dragged by the drinking recipient (1). Said rotation element (26) presents engagement elements (261) adapted so engage in movable manner in grooves (271) that develop in a respective angular extension in wall of a collection casing (27) adapted so that provides rotation of said rotation support (26) along of said grooves (271).

Said collection casing (27) is provided in connection with interface means (7) provided in the form of a second rotation element (71) that presents an angular indication element (711). This angular indication element (71) can be a magnet with a Hall effect sensor ("encoder"), adapted so that actuates a mechanical or magnetic switch, a variable electric resistance (not represented), or similar, according to the extension of its angular extension.

Figure 20:
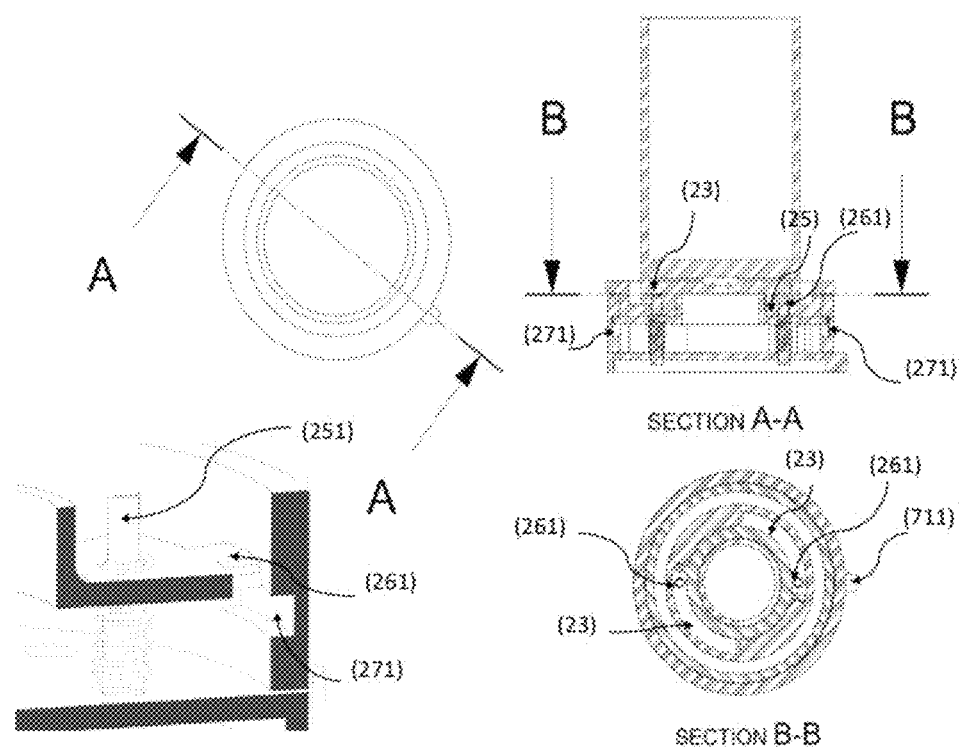
FIG. 20: top and side cut views, and respective cuts of the embodiment according to FIG. 19, in a first placement position of the drinking recipient (1)
Figure 21:
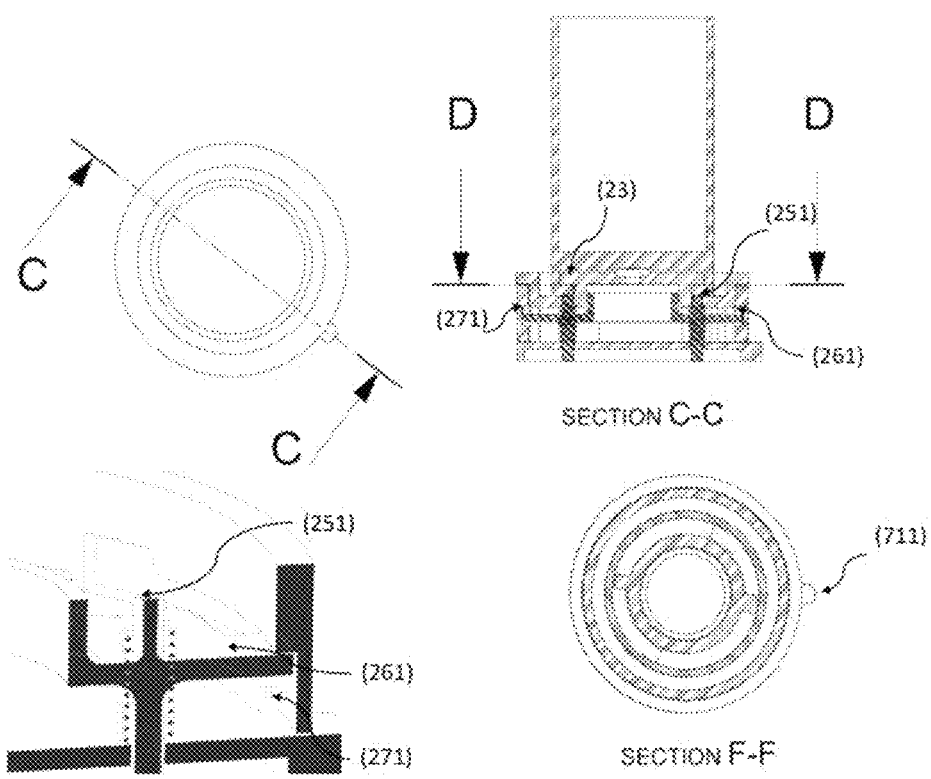
FIG. 21: views according to those of FIG. 20, in a second placement position of the drinking recipient (1)
Figure 22:
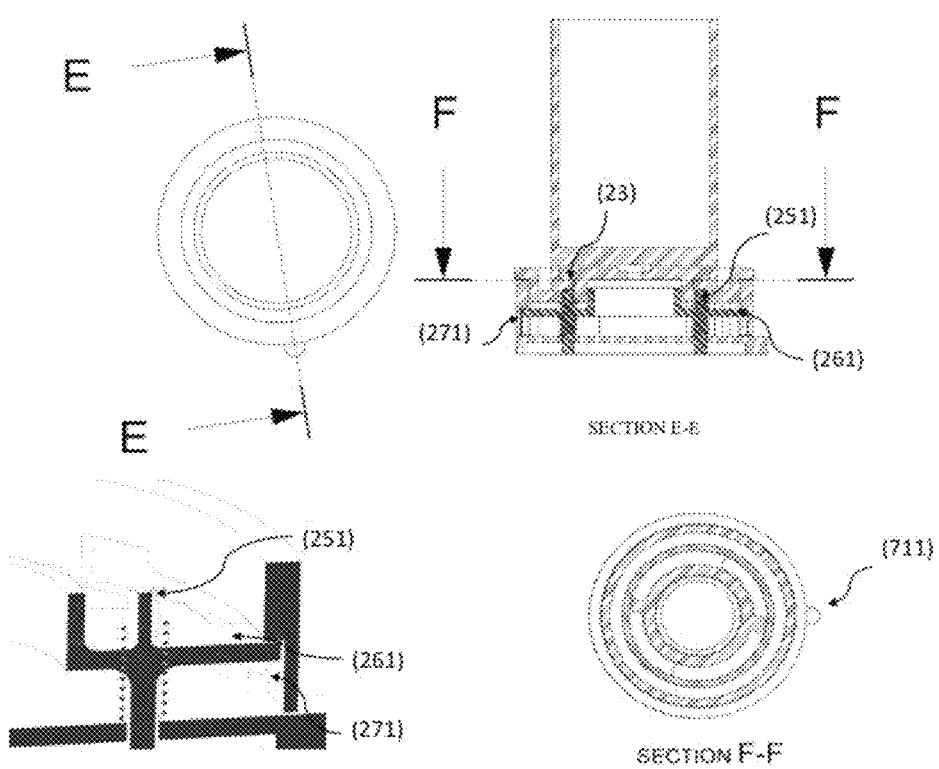
FIG. 22: views according to those of FIG. 20, in a third placement position of the drinking recipient (1)

FIGS. 20 to 22 represent three successive positions of a drinking recipient (1) placed on the placement disposition (2) and manipulated so as to regulate a parameter of beverage discharge, for example the quantity of beverage.

On a first position (FIG. 20), the drinking recipient (1) is at an initial placement position on the rotation support (25), whereas as a second position (FIG. 21) is rotated around itself relative to the initial placement position, to a retention position where is retained by retention means (23) (FIG. 21). In particular, in this retention position, the base region of the drinking recipient (1) pressures the actionable pin (251) elastically downwards, so that the drinking recipient (1) can be additionally rotated.

A user can rotate the drinking recipient (1), and therewith also the angular indication element (711), to one of a plurality of possible angular positions (FIG. 22), thereby providing a signal to control means (5) relating to a quantity of given operation parameter, for example the quantity of beverage to be discharged.

It is preferred when the user further has the possibility of varying the extension of rotation of the drinking recipient (1) after the start of the preparation cycle, and this variation is still considered after start of the cycle and before of conclusion thereof. For example, the beverage discharge can be interrupted before reaching the selected volume if, after start of the extraction and discharge, there is detected a reduction of the angular position of said angular indication element (711). Likewise, a user can obtain a bigger volume of beverage than the corresponding to the initial selection if, before concluded the extraction and discharge, there is detected an increase of the relative angular position of said angular indication element (711).

Figure 23:
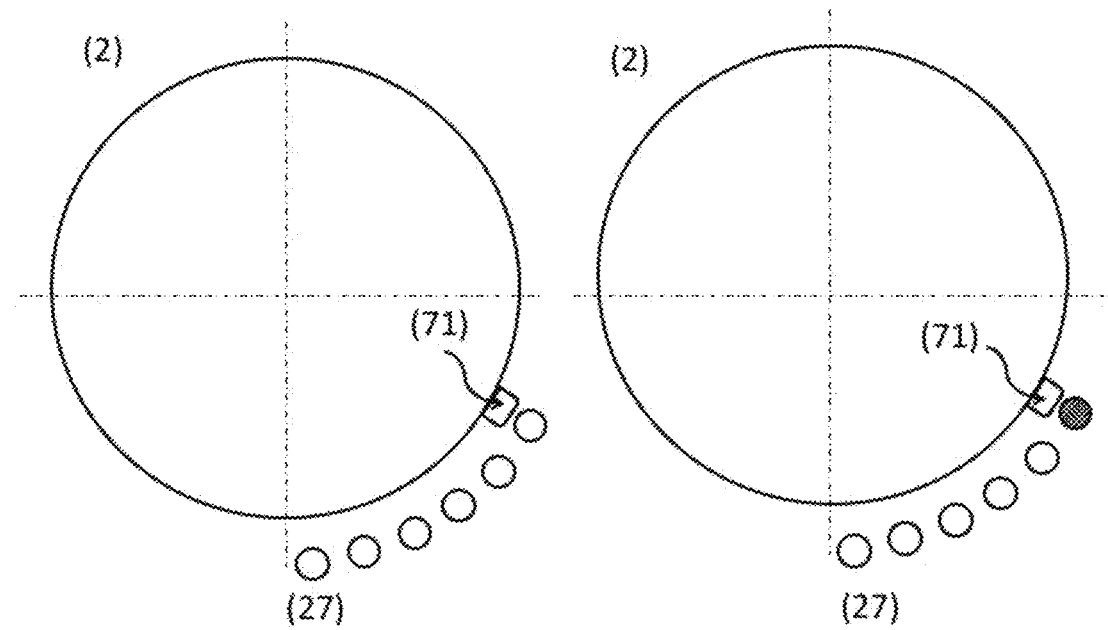
FIG. 23: top views of a placement disposition (2) in two actuation moments of output means (27)
Figure 24:
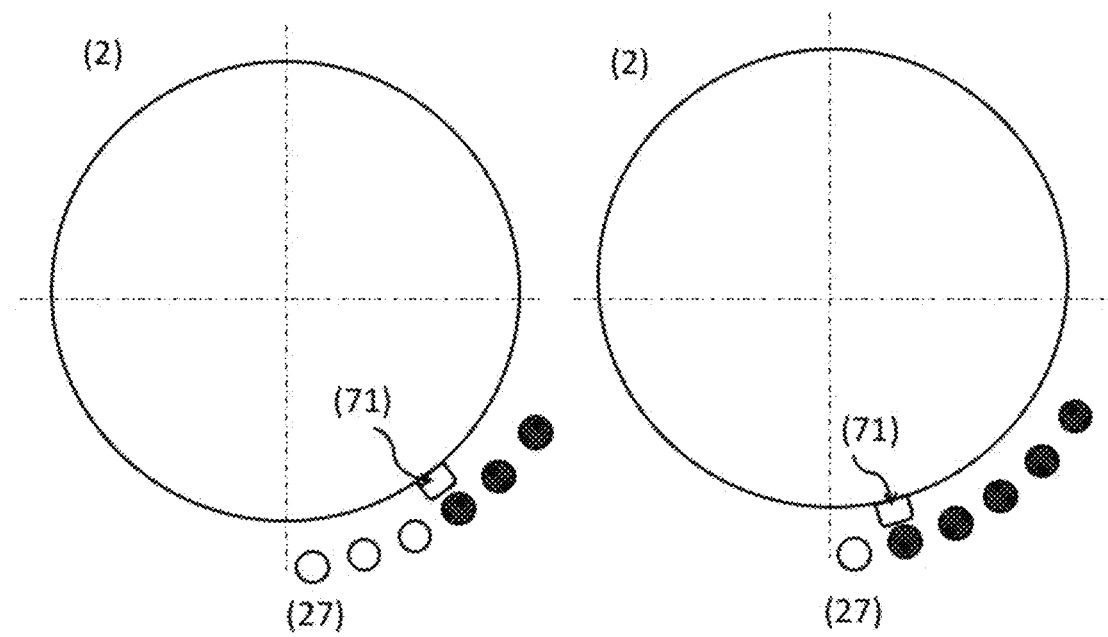
FIG. 24: top views of a placement disposition (2) in following two successive actuation moments of output means (27)

FIGS. 23 and 24 represent an embodiment of output means (27) associated with said placement disposition (2), in particular in a concentric alignment with the position of the drinking recipient (1), ad actuated according to the actuation of said interface means (7) so that display an indication of the quantity selected by the user.

In the case of this embodiment, said output means (27) are provided as a succession of light dots arranged in the proximity and along the angular region associated with the extension of possible rotation of the drinking recipient (1) on the rotation support (25). In particular, the output means (27) are adapted so that light up according to the rotation of a drinking recipient (1) on said rotation support (25), thereby providing the user with a relative indication of the quantity of beverage selected by the user for discharge.

It is preferred when, after a previously defined period of time without said interface means (7) detecting any movement, be provided a variation of the actuation of the output means (27), for example a variation of at least one of luminous intensity, colour, and lighting frequency, so as to communicate the start of the beverage preparation cycle.

Alternatively, or in combination with a luminous visual indication, the drinking recipient (1) can present a handle provided in a position with relation to respective engagement means (14) such that provide the user with an indication of the quantity selected with relation to at least one reference marking, for example associated with a maximum volume, arranged on the placement disposition (2).

Figure 25:
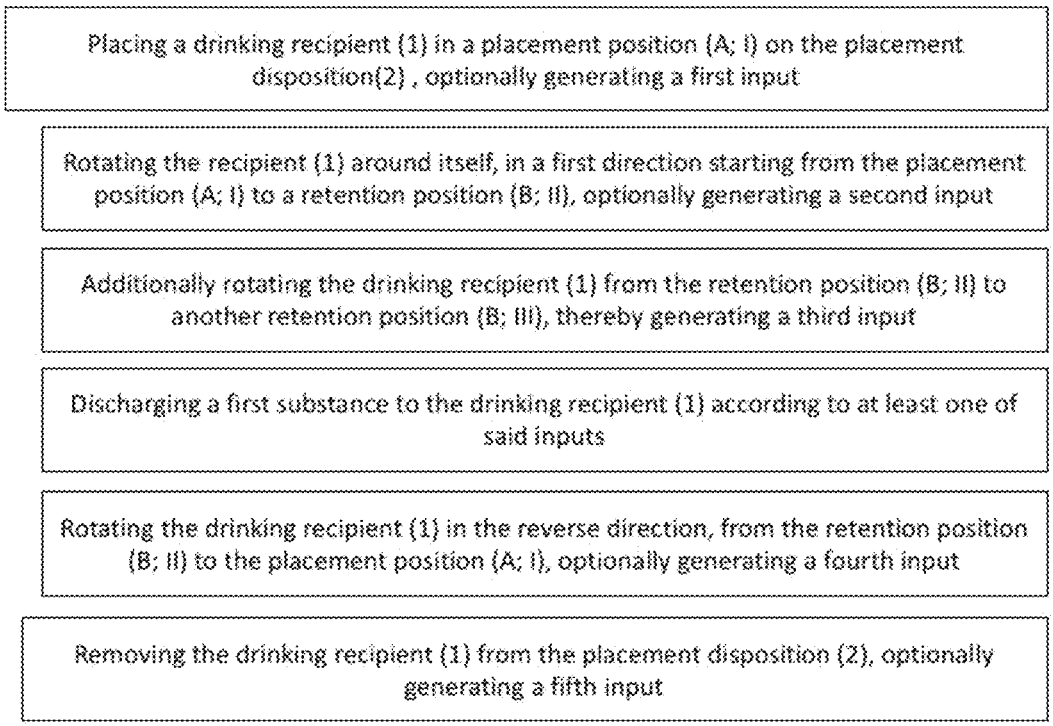
FIG. 25: diagram of a first preferred embodiment of a process according to the present invention of regulation of operation of a system of distribution of edible products.
Figure 26:
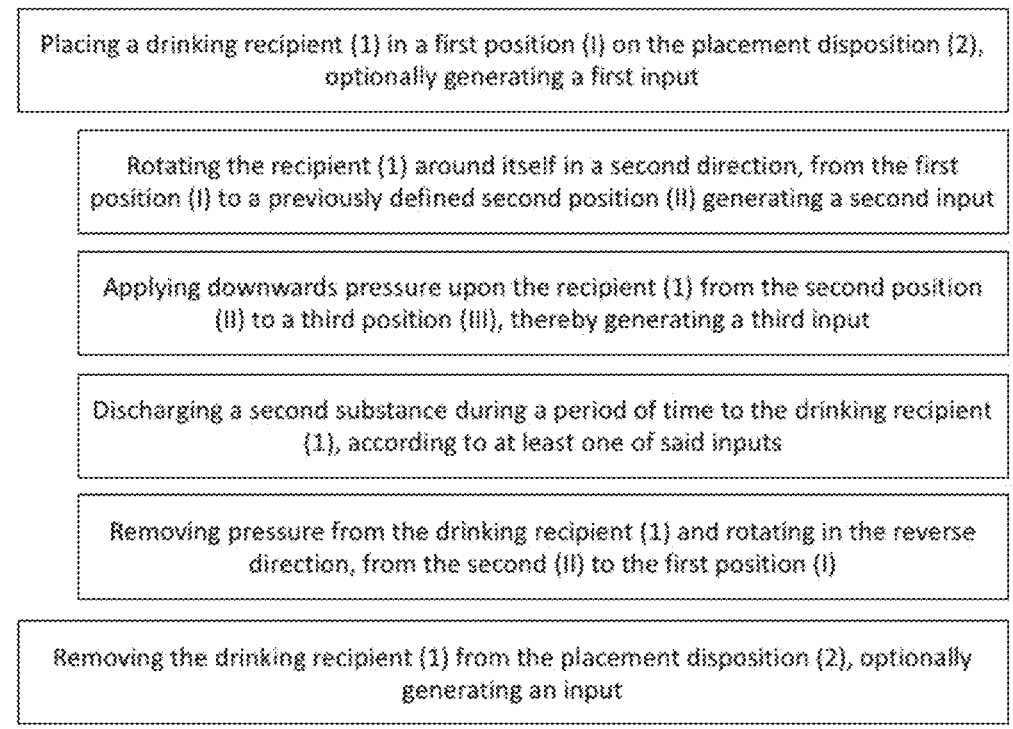
FIG. 26: diagram of a first preferred embodiment of a process according to the present invention of regulation of operation of a system of distribution of edible products.

FIGS. 25 and 26 represent two preferred embodiment of a process of regulation according to the present invention.

The placement of the drinking recipient (1) on the placement disposition (2), on a first position, notably on a position of correct placement (A) thereon, corresponding to a first reference position (I), can generated a first input to the control means (5).

The rotation of the drinking recipient (1) around itself, for example in the clockwise direction, to a second reference position (II), corresponding for example to a retention position (B), can generate a second input. This second input can, for example, unblock the operation of the flow pressurization device (6).

The additional rotation of the drinking recipient (1) around itself, until a third retention position (III), can generate another input that is used for starting the process of preparation of edible product and respective discharge. Moreover, the relative extension of the movement carried out between the second (II) and third (III) reference position, notably both being retention positions (B), can be used as input for regulating the quantity of product to be discharge.

Said third reference position (III) can be one of a plurality of previously defined possible retention positions (B), or can correspond to a position comprised in a continuous extension of successive regulation positions, along which said drinking recipient (1) is operatively retained on the placement disposition (2).

It is preferred when the rotation in an opposite direction, generates different inputs, for example associated with the selection of another type of operation, or type of substance or product to be discharged to the drinking recipient (1). A user can thus place a drinking recipient (1) on the placement disposition (2), rotate in one direction (C) so as to discharge a pre-heating flow, or a flow of milk. The user can then rotate the drinking recipient (1) back to the initial position (A; I), and in the opposite direction beyond the retention position (B; II) so as to obtain discharge of a given quantity of espresso coffee, for example proportionally to the extension of the rotation movement beyond the rotation movement (B; II).

Besides of the rotation movement, also said interface means (7) can be adapted so as to generate inputs for regulation of the operation of the apparatus (3), based upon the placement of the drinking recipient (1) at an initial position (A; I), and removal thereof.

It is preferred when the application of pressure upon said drinking recipient (1) downward, also generates an input that can be used by the control means (5) for regulation of a given operation parameter of the apparatus (3).

Lisbon, Oct. 22, 2019

The invention claimed is:

1. A system for distribution of edible products and that includes:
   a recipient configured to be operatively placed on a placement disposition where the recipient can collect an edible product,
   an apparatus for distribution of edible product presenting said placement disposition,
   said placement disposition presenting a product discharge configured to discharge the edible product to the recipient in case the recipient is operatively placed on the placement disposition,
   said apparatus comprising control means being configured to control the operation of the apparatus, including operation parameters, data communication and display of information associated with operation cycles thereof, wherein
   said apparatus presents interface means configured to apprehend at least one aspect of a rotation movement of the recipient operatively placed on said placement disposition, and provide a respective input to said control means.

2. The system according to claim 1, wherein
   said interface means is operatively associated with said placement disposition and is configured to apprehend at least one of:
   correct placement of the recipient by the user on the placement disposition,
   correct retention of the recipient by the user on the placement disposition, and
   at least one aspect of rotation movement of the recipient around itself by the user, and
   said interface means is configured to provide input to the control means based upon the apprehension of a respective aspect of rotation movement of the recipient around itself and for regulation of at least one respective operation parameter of the apparatus.

3. The system according to claim 1, wherein
   said interface means is configured to apprehend at least one aspect of rotation movement of the recipient operatively placed on the placement disposition, including by means of a remote manner, by means of a proximal manner with relation to the recipient or by means of direct contact therewith, and
   said interface means is configured to apprehend at least one of:
   type of movement,
   direction of movement, and
   at least one of: operative presence and retention of the recipient on the placement disposition;

extension of movement of the rotation movement by the recipient around itself on the placement disposition between at least one of:
  a placement position and a retention position of the recipient;
  a plurality of relative angular positions of the recipient in retention condition.

4. The system according to claim 1, wherein
said interface means is configured to be actuated by the recipient operatively placed on the placement disposition, including jointly moved by a movement of the recipient, including by means of at least one of: material engagement between the materials in direct contact, magnetic engagement, electromagnetic engagement, mechanical engagement by pressurized fitting of male-female, bayonet, screw type, or similar, so that at least one rotation movement of the recipient around itself leads to a corresponding movement of the interface means.

5. The system according to claim 1, wherein
said interface means is configured to be engaged by the recipient operatively placed on the placement disposition and moved from at least one of: a first placement position and a second position of the recipient where it is operatively retained on said placement disposition, and that can be disengaged in case the recipient is moved from said positions in a reverse movement.

6. The system according to claim 1, wherein
said interface means comprises a rotation part associated with the base region of the recipient so that can be jointly moved by a rotation movement thereof, whereby said rotation part is provided in functional connection with a part of electrical variation by rotation thereof so that the extension of the rotation movement of said recipient is converted in an electrical signal.

7. The system according to claim 1, wherein
said interface means is provided in operative connection with said control means so as to provide input to at least one of:
  selection of the type of cycle of substance discharge to the recipient;
  actuation of start of cycle of preparation of edible product;
  regulation of the quantity of edible product to be discharged through the placement disposition;
  start and end of the discharge of edible product through the placement disposition,
  actuation of at least an opening movement of a supply passage of portion of edible substance, and product preparation device operatively associated therewith,
  information display to the user of the state associated with at least one of said selection interactions.

8. The system according to claim 1, wherein
said interface means is provided in functional connection with the control means and is configured to provide selection of type or characteristics of edible product and/or discharge thereof, according to at least one of:
  type of movement;
  direction of movement, and
said interface means is configured to provide input for regulation of the discharge quantity according to at least one of:
  the extension of movement of engagement of the recipient on said placement disposition, including at least a first position;
  the period of time during which the recipient is operatively engaged in the placed disposition, at least in an extension of engagement movement that corresponds to a first position or to a second position in retention condition.

9. The system according to claim 1, wherein
said apparatus presents display means associated with said placement disposition configured to display to the user an indication of variation generated by the rotation of the recipient around itself.

10. A process for operation of the system according to claim 1, said process including a selection interaction by a user of the apparatus so as to regulate an operation cycle thereof,
wherein
said selection interaction includes the actuation by the user of at least one rotation movement of the recipient around itself when operatively placed on the placement disposition of the apparatus, said actuation being carried out before start of each operation cycle, and the realization of the operation cycle not requiring the actuation by the user of other interface of use of the apparatus.

11. The process according to claim 10, wherein
said selection interaction is apprehended by control means so as to determine the selection of at least one of:
  type of operation of the apparatus,
  type of edible product,
  quantity information associated to respective discharge of edible product to the recipient, the quantity information including at least one of:
    relative quantity with relation to at least one minimum and/or maximum reference;
    duration of the product discharge, and
    volume of product discharge,
and
said rotation movement of the recipient on the placement disposition is associated by the control means to at least one of: start, stop, duration and volume of discharge of edible product.

12. The process according to claim 10, wherein
said selection interaction comprises the following steps:
  placing the recipient in an initial placement position on a placement disposition;
  moving the recipient in a first movement in a first direction to a position of operative retention on said placement disposition,
  moving the recipient additionally in the first direction and in a given extension comprises between a first retention position and a second retention position that corresponds to a maximum extension of movement of the recipient beyond the first retention position;
  providing a first operation input to the control means after the recipient is at a given first operating position, corresponding to the position to where the recipient has been moved to by the user in the movement extension interval defined by said first retention position and said second retention positions during a previously defined period of time;
  initiating flow circulation according to said first operating position;
  carrying out the discharge of a first edible product by the beverage discharge means on the placement disposition to the recipient through the base thereof,
  additionally moving the recipient during said discharge of edible substance and thereby provide a second operation input, including increasing and/or reducing the extension of movement relative to the first operating position, whereby the second operation input corresponds to the difference of operation value to the operation value associated with said first operation input;

concluding the discharge of edible product after at least one of:

being attained the operation value associated with the previous of said first and second operation inputs provided to the control means;

the recipient being moved to the first retention position still during the discharge of edible product;

moving the recipient in a direction reverse to the first direction, back to the first retention position and beyond thereof, in a second direction, thereby releasing the recipient from retention in the placement disposition;

removing the recipient of placement disposition.

13. The process according to claim 10, wherein said selection interaction further comprises at least one of the steps:

moving the recipient in a second movement in operative retention on the placement disposition, initiating and concluding the discharge of a second edible substance to the recipient, moving the recipient in a third movement in operative retention on the placement disposition, carrying out the discharge of at least one of: a heating flow configured to heat the recipient and a purge flow configured to clean at least of the placement disposition, removing the recipient from the placement disposition.

14. The process according to claim 10, wherein said selection interaction further includes:

moving the recipient in a second movement in operative retention on the placement disposition, initiating and concluding the discharge of a second edible product to the recipient, removing the recipient.

15. The process according to claim 10, wherein said selection interaction further includes the selection of at least one of:

type of operation of the apparatus;

parameter of operation of preparation of edible product;

type of edible product;

quantity of edible product to be discharged;

discharge parameter of edible product to be discharged;

whereby to each one of the selections corresponds at least one of: type of movement and extension of movement of the recipient on the placement disposition.

16. The process according to claim 10, wherein said selection interaction further includes at least one of the following steps:

passing the apparatus from a "standby" state to an operation-ready state;

actuation of opening and closing of an introduction passage of portion of edible substance;

introduction of a portion of edible substance through said introduction passage of portion;

actuation of opening and closing of an extraction device;

whereby at least one of said steps is automatically initiated after the placement of the recipient in operative retention on the placement disposition.

17. The system according to claim 1, wherein said interface means is configured to be actuated by the recipient operatively placed on the placement disposition, including jointly moved by a movement of the recipient, including by means of at least one of: material engagement between materials in direct contact, magnetic engagement, electromagnetic engagement, mechanical engagement by pressurized fitting of male-female, bayonet, screw type, or similar, so that at least a vertical movement along a reference axis leads to a corresponding movement of the interface means.

18. The system according to claim 1, wherein said interface means is provided in operative connection with said control means so as to provide input to at least one of:

selection of type of cycle of substance discharge to the recipient;

actuation of start of cycle of preparation of edible product;

regulation of quantity of edible product to be discharged through the placement disposition;

start and end of the discharge of edible product through the placement disposition, actuation of at least a closing movement of a supply passage of portion of edible substance, and product preparation device operatively associated therewith, information display to a user of a state associated with at least one of selection interactions.

19. The system according to claim 1, wherein said interface means is configured to be engaged by the recipient operatively placed on the placement disposition in a previously defined position so as to be operatively retained on the placement disposition, and moved from at least one of: a first placement position and a second position of the recipient where it is operatively retained on said placement disposition, and that can be disengaged in case the recipient is moved from said first placement position or second placement positions in a reverse movement.

20. The system according to claim 1, wherein said interface means is configured to apprehend at least one aspect of rotation movement of the recipient operatively placed on the placement disposition, including by means of a remote manner, by means of a proximal manner with relation to the recipient or by means of direct contact therewith, and said interface means is configured to apprehend at least one of:

at least one rotation movement of the recipient around itself and a vertical movement of the recipient along the reference axis, at least one of: rotation in the clockwise direction and rotation in the anti-clockwise direction, and at least one of: operative presence and retention of the recipient on the placement disposition;

extension of movement of the rotation movement by the recipient around itself on the placement disposition between at least one of:

a placement position and a retention position of the recipient;

a plurality of relative angular positions of the recipient in retention condition.

\* \* \* \* \*